(12) United States Patent
Diskin

(10) Patent No.: US 9,616,858 B2
(45) Date of Patent: Apr. 11, 2017

(54) JOINTED CAR WASH GRAVITY HOSE BOOM

(71) Applicant: Troy Diskin, Algonquin, IL (US)

(72) Inventor: Troy Diskin, Algonquin, IL (US)

( * ) Notice: Subject to any disclaimer, the term of this patent is extended or adjusted under 35 U.S.C. 154(b) by 0 days.

(21) Appl. No.: 14/842,101

(22) Filed: Sep. 1, 2015

(65) Prior Publication Data

US 2016/0059257 A1    Mar. 3, 2016

Related U.S. Application Data

(60) Provisional application No. 62/070,675, filed on Sep. 2, 2014.

(51) Int. Cl.
*B05B 15/06* (2006.01)
*B60S 3/04* (2006.01)

(52) U.S. Cl.
CPC ..................... *B60S 3/047* (2013.01)

(58) Field of Classification Search
CPC ........................................ B60S 3/047
USPC ........... 248/58, 59, 62, 75, 81, 279.1, 282.1, 248/285.1; 134/123; 137/615; 239/209, 239/750, 752
See application file for complete search history.

(56) References Cited

U.S. PATENT DOCUMENTS

| | | | | |
|---|---|---|---|---|
| 3,167,797 A | * | 2/1965 | Hergonson | B60S 3/04 134/103.2 |
| 3,229,703 A | * | 1/1966 | Thompson | B60S 3/044 134/100.1 |
| 3,299,901 A | * | 1/1967 | Axe | B60S 3/04 134/123 |
| 5,620,157 A | * | 4/1997 | Titzer | B60S 3/047 239/750 |
| 6,135,363 A | * | 10/2000 | Titzer | B60S 3/04 134/123 |
| 6,601,811 B1 | * | 8/2003 | Van Lieshout | F16M 11/04 248/282.1 |
| 7,431,221 B2 | * | 10/2008 | Thompson | A01B 73/065 239/166 |
| 2002/0129515 A1 | * | 9/2002 | Morris | B60S 3/002 34/666 |
| 2011/0072956 A1 | * | 3/2011 | Wall | F41A 35/00 89/1.11 |

FOREIGN PATENT DOCUMENTS

FR    2754746 A3 *  4/1998  ............. B60S 3/045

\* cited by examiner

*Primary Examiner* — Gwendolyn Baxter
(74) *Attorney, Agent, or Firm* — Justin Lampel

(57) ABSTRACT

A jointed car wash gravity hose boom is provided. The jointed car wash gravity hose boom has a first frame unit and a second frame unit secured together at a joint and wherein the first frame unit has a lower support beam and an upper support beam wherein the lower support beam extends upward at approximately a ten to forty degree angle. A hose supplying air, water, soap, wax, foam, tire shine or other liquids for washing a car is secured to the second frame and extends downward at the distal end of the second frame. When the hose is pulled into place by a user, the first frame and second frame generally extend at the joint and allow the user to move the hose around a car wash bay. When relaxed, the jointed car wash gravity hose boom folds at the joint and automatically moves parallel to a wall by gravity.

15 Claims, 5 Drawing Sheets

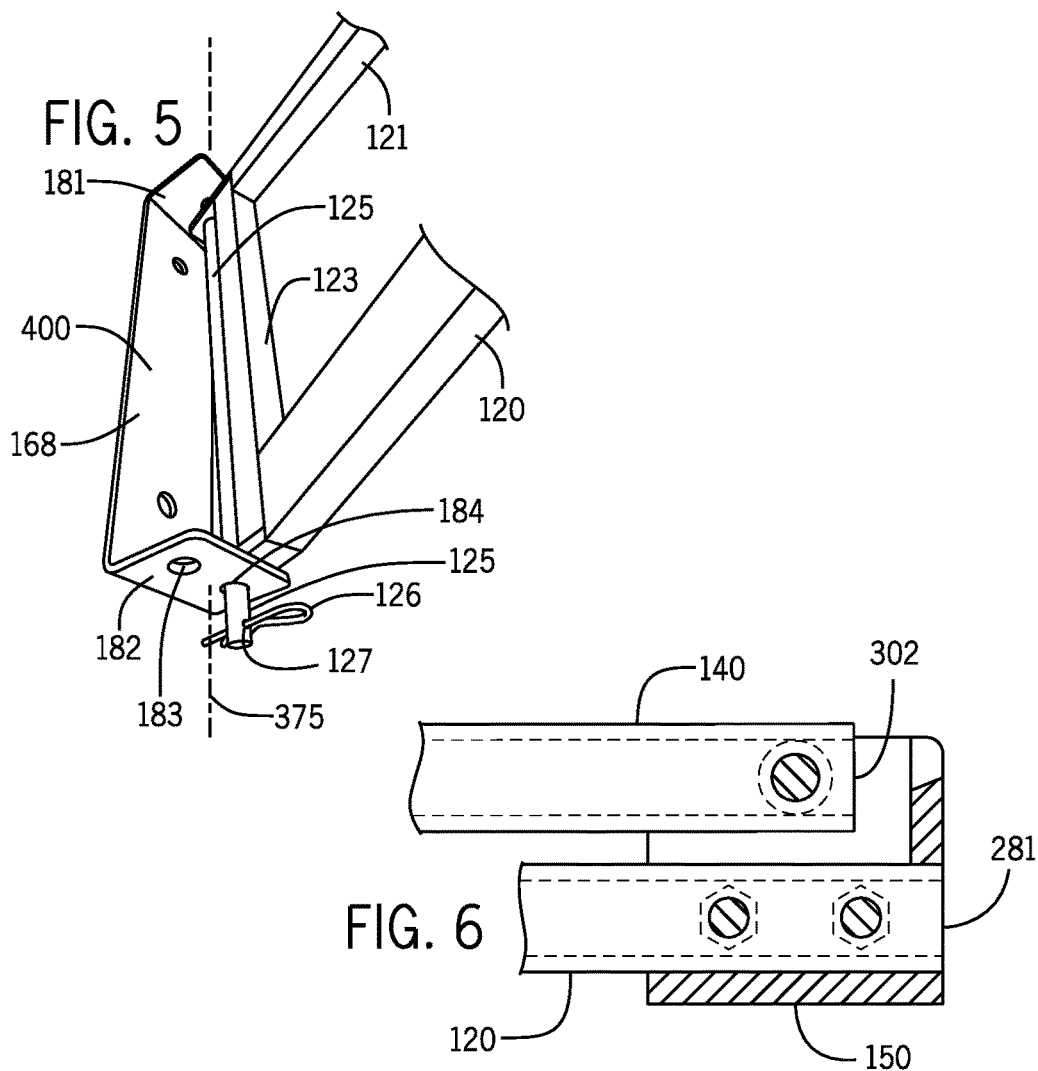
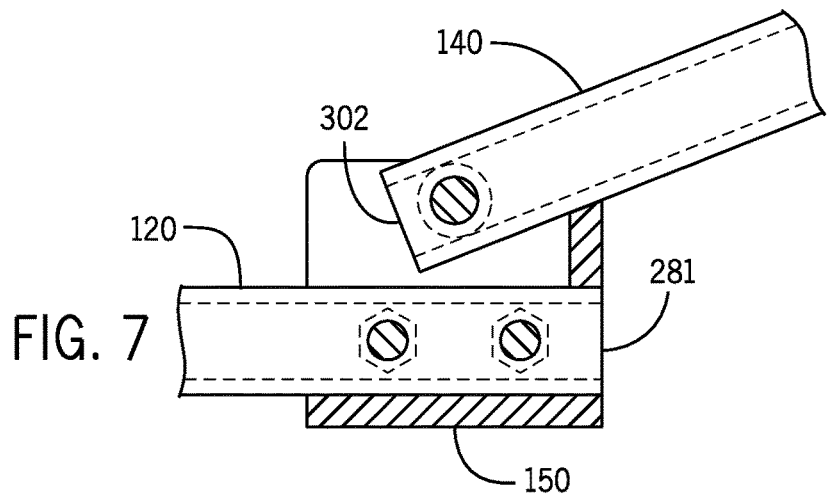

JOINTED CAR WASH GRAVITY HOSE BOOM

CROSS-REFERENCE TO RELATED APPLICATIONS

The following application is based on and claims the priority benefit of U.S. provisional application Ser. No. 62/070,675 filed Sep. 2, 2014 currently co-pending; the entire contents of which are incorporated by reference.

BACKGROUND OF THE INVENTION

A jointed car wash gravity hose boom is provided. The jointed car wash gravity hose boom has a first frame unit and a second frame unit secured together at a joint and wherein the first frame unit has a lower support beam and an upper support beam wherein the lower support beam extends upward from a securing wall bracket at approximately a ten to forty degree angle with respect to a wall or pole. The second frame unit is jointed to the first frame and extends upward at the same angle as the lower support beam of the first frame unit. A hose supplying air, water, soap, wax, foam, a tire shine fluid or other liquids for washing a car at a self-service car wash is secured to the second frame and extends downward at the distal end of the second frame unit. When the hose is pulled into place by a user, the first frame unit and second frame unit generally extend at the joint and allow the user to move the hose around a car wash bay. When relaxed, the jointed car wash gravity hose boom folds at the joint and automatically moves parallel to a wall by gravity.

Booms used for hoses in car wash bays have been invented in the past. For example, U.S. Pat. No. 7,597,272 to *Wiebe* discloses a double boom arrangement for use in a car wash having a first and a second boom assembly mounted side by side on a respective rotatable coupling so that a horizontal portion of the hose of each boom can rotate about a vertical axis in a generally horizontal plane with the remainder of the hose extending downwardly from the horizontal plane at an outer end of the boom. Each boom has a parking arrangement for moving the boom and the hose to a parked location extending 180 degree away from the other boom. The boom includes a first inner and a second outer boom portion with the inner and outer portions connected by a second swivel coupling parallel to the first and spaced outwardly therefrom. The inner boom portion is mounted on a bracket for pivotal movement about a horizontal axis and constrained by two horizontal springs above the pivot axis. The springs are mounted at opposite ends of a rod bent around the pivot axis where each is compressed as the first boom portion pivots downwardly. The second boom portion uses a spring wire support to provide a second pivot action.

Further, U.S. Pat. No. 5,620,157 to *Titzer* discloses a car wash boom system having a low pressure washing brush boom and a high pressure pre-rinsing/rinsing wand boom which are mounted for relative rotation about side-by-side generally vertical axes. The washing brush boom includes first and second opposite end portions and a medial portion there between with a first and second portions being generally parallel to each other and the medial portion being normal thereto. A cam follower is carried by the second end portion of the washing brush boom and rides along a generally circular cam surface whose axis is the vertical axis of rotation of the washing brush boom. The second offset portion of the washing brush boom is mounted for rotation about a generally horizontal axis which is normal to its vertical axis of rotation. A torsion spring normally urges the washing brush boom to an inoperative position in which the first end portion of the washing brush boom lies in a horizontal plane above a horizontal plane of rotation of the pre-rinsing/rinsing wand boom. When in the latter position, the pre-rinsing/rinsing wand boom can rotation freely beyond 360.degree. about its vertical axis absent interference with the washing brush boom, particularly when the latter is in its "parked" position.

Still further, U.S. Pat. No. 5,110,049 to Harris discloses a boom system for dispensing fluids in which two or more boom arms are mounted for rotation on a fixed tubular member. Each boom arm is capable of unlimited angular rotation about the axis of the tubular member and first and second fluids are independently directed to the first and second boom arms, respectively, for discharge thereby.

However, these patents fail to describe a jointed car wash gravity hose boom which is easy to use and efficient as in the present application. Further, these patents fail to provide a jointed car wash gravity hose boom which utilizes gravity to fold the boom generally in half and automatically stores the boom in a generally parallel manner with respect to a wall of a car wash bay.

SUMMARY OF THE INVENTION

A jointed car wash gravity hose boom is provided. The jointed car wash gravity hose boom has a first frame unit and a second frame unit secured together at a joint and wherein the first frame unit has a lower support beam and an upper support beam wherein the lower support beam extends upward from a securing wall bracket at approximately a ten to forty degree angle with respect to a wall or pole. The second frame unit is jointed to the first frame and extends upward at the same angle as the lower support beam of the first frame unit. A hose supplying air, water, soap, wax, foam, a tire shine fluid or other liquids for washing a car at a self-service car wash is secured to the second frame and extends downward at the distal end of the second frame unit. When the hose is pulled into place by a user, the first frame unit and second frame unit generally extend at the joint and allow the user to move the hose around a car wash bay. When relaxed, the jointed car wash gravity hose boom folds at the joint and automatically moves parallel to a wall by gravity.

An advantage of the present jointed car wash gravity hose boom is that, when relaxed, the device automatically folds and moves parallel to the wall of a car wash bay by gravity.

And an advantage of the present jointed car wash gravity hose boom is that the present device allows a car wash owner to save space within a car wash bay therein allowing the car wash owner to add additional car wash related features.

Another advantage of the present jointed car wash gravity hose boom is that the present device is non-corrosive and durable.

Still another advantage of the present jointed car wash gravity hose boom is that a user may select which direction the device will relax in depending on where the user inserts a pivot pin into a securing wall bracket.

And another advantage of the present jointed car wash gravity hose boom is that the present device may retract allowing it to fit under existing booms of a car wash bay.

Still another advantage of the present jointed car wash gravity hose boom is that the present device prevents the hoses and other booms of a car wash bay from tangling.

Another advantage of the present jointed car wash gravity hose boom is that the present device does not require springs, which often break and need to be maintained or replaced in traditional car wash bay booms.

Yet another advantage of the present jointed car wash gravity hose boom is that the present device allows for an elevated hose; therein allowing larger vehicles to utilize the present device.

For a more complete understanding of the above listed features and advantages of the present jointed car wash gravity hose boom reference should be made to the detailed description and the drawings. Further, additional features and advantages of the invention are described in, and will be apparent from, the detailed description of the preferred embodiments.

BRIEF DESCRIPTION OF THE DRAWINGS

FIG. 5 illustrates a close-up perspective view of the securing wall bracket of the present jointed car wash gravity hose boom.

FIG. 6 illustrates a top view of the joint of the car wash gravity boom wherein the boom is in the folded Second Position B as illustrated in FIG. 4.

FIG. 7 illustrates a top view of the joint of the car wash gravity boom wherein the boom is in the process of being fully extended First Position A as illustrated in FIG. 3.

DETAILED DESCRIPTION OF THE PREFERRED EMBODIMENTS

A jointed car wash gravity hose boom is provided. The jointed car wash gravity hose boom has a first frame unit and a second frame unit secured together at a joint and wherein the first frame unit has a lower support beam and an upper support beam wherein the lower support beam extends upward from a securing wall bracket at approximately a ten to forty degree angle with respect to a wall or pole. The second frame unit is jointed to the first frame and extends upward at the same angle as the lower support beam of the first frame unit. A hose supplying air, water, soap, wax, foam, a tire shine fluid or other liquids for washing a car at a self-service car wash is secured to the second frame and extends downward at the distal end of the second frame unit. When the hose is pulled into place by a user, the first frame unit and second frame unit generally extend at the joint and allow the user to move the hose around a car wash bay. When relaxed, the jointed car wash gravity hose boom folds at the joint and automatically moves parallel to a wall by gravity.

Figure 1:
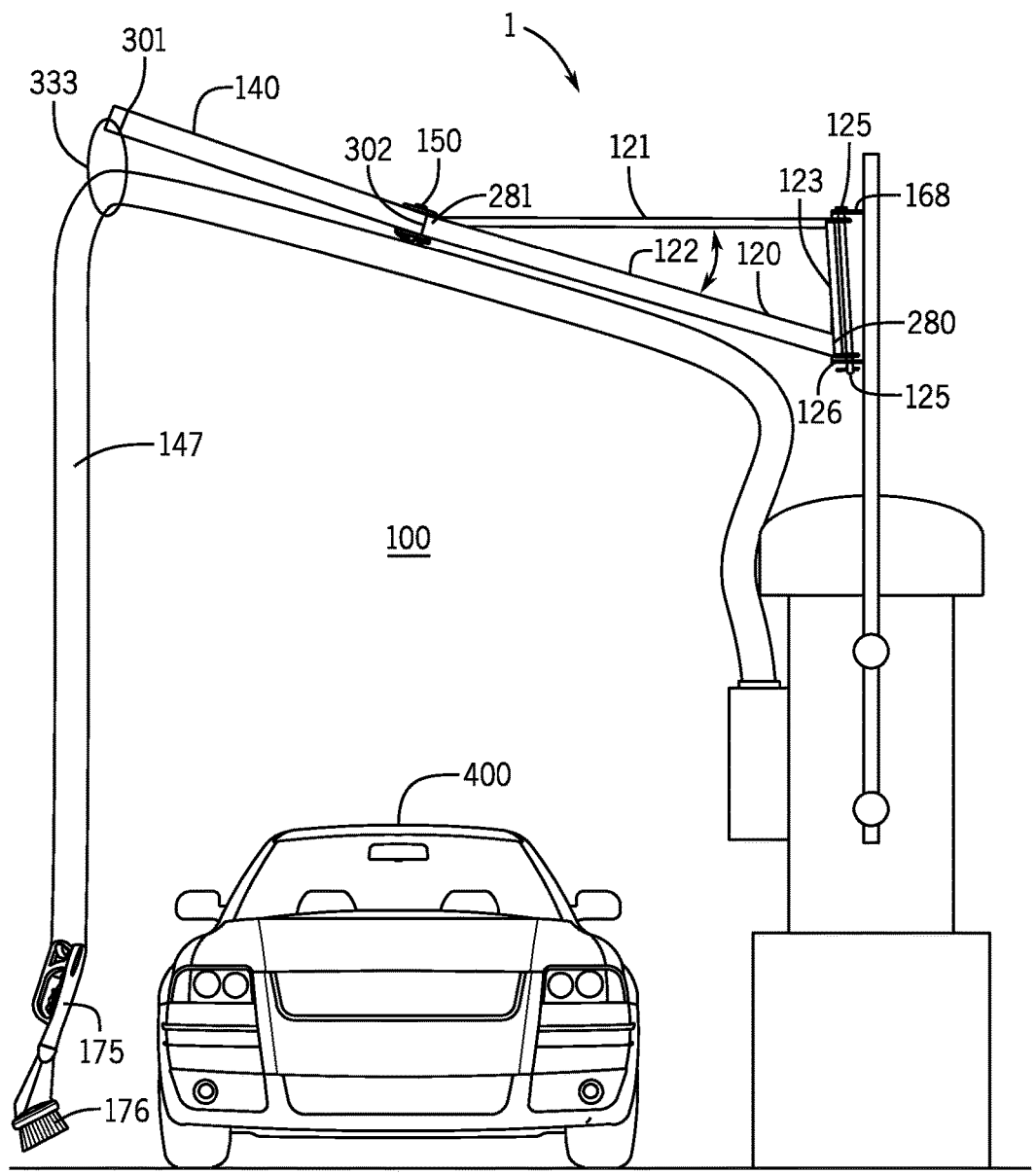
FIG. 1 illustrates the jointed car wash gravity boom located within an in-bay car wash wherein the present boom is in the First Position A.
Figure 2:
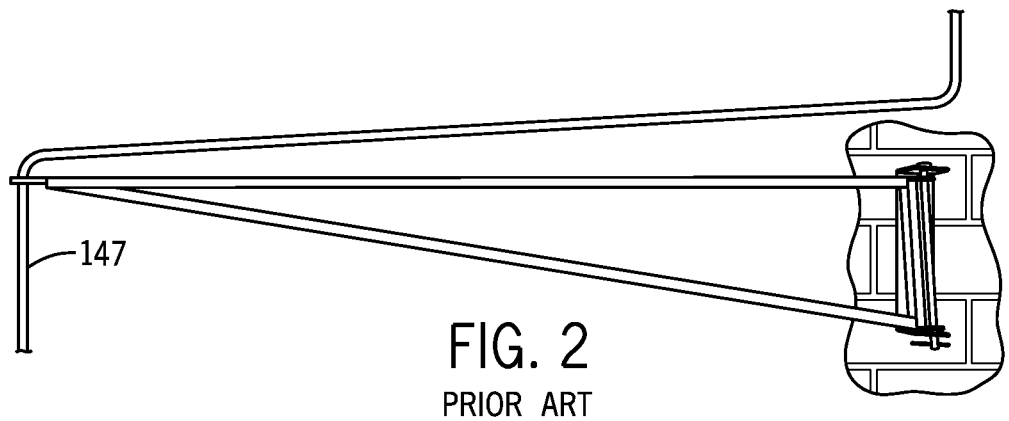
FIG. 2 illustrates a prior art car wash hose boom lacking a joint.
Figure 3:
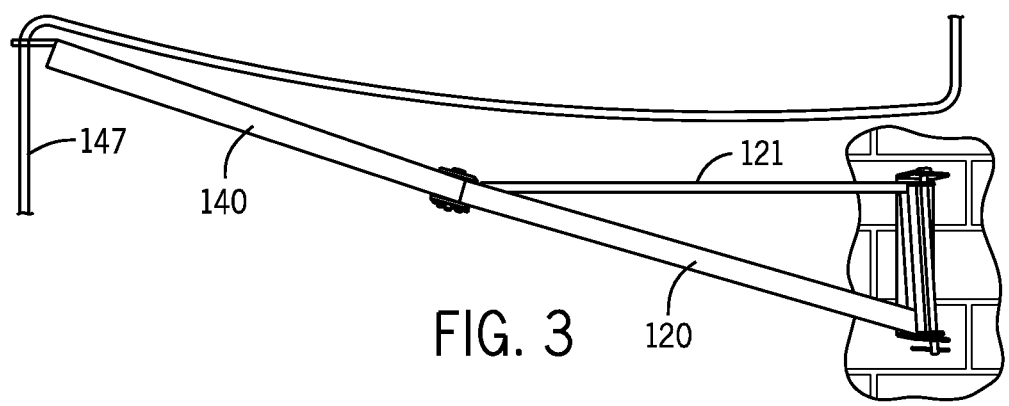
FIG. 3 illustrates a side view of the present jointed car wash gravity hose boom wherein the boom is fully extended in the First Position A.
Figure 4:
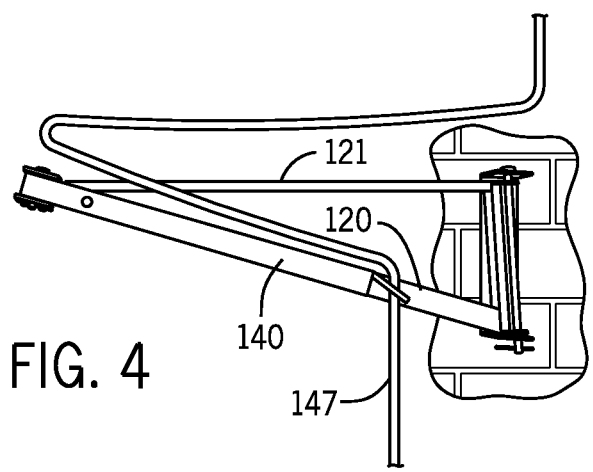
FIG. 4 illustrates a side view of the present jointed car wash gravity hose boom wherein the boom is in the folded Second Position B.
Figure 8:
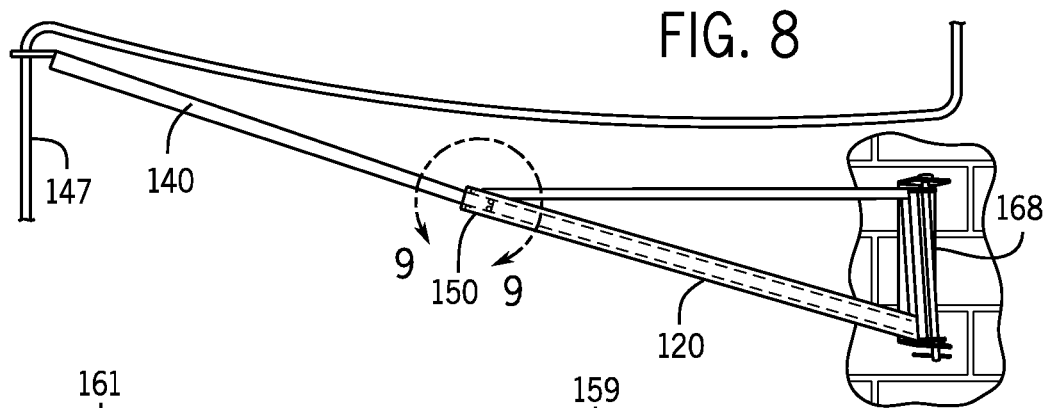
FIG. 8 illustrates a side view of the present jointed car wash gravity hose boom wherein the device is fully extended in the First Position A.

Referring first to FIG. 1, in an embodiment, a jointed car wash gravity hose boom 1 is provided. The jointed car wash gravity hose boom 1 is especially suitable for use in, for example, a car wash bay 100. The jointed car wash gravity hose boom 1 is preferably made of a durable and non-corrosive material such as stainless steel or other suitable metal.

The jointed car wash gravity hose boom 1 may have a first frame member unit 120, a second frame member unit 140, a securing wall bracket 168 and a joint section 150 having a hinge. The joint section 150 may allow the second frame member unit 140 to rotate one hundred and eighty degrees with respect to the first frame member unit 120. In particular, unless manually moved by a user, the second frame member unit 140 automatically rotates at the jointed hinge 150 to an adjacent and parallel orientation (FIG. 10) with respect to the first frame member unit 120 by gravity as a result of the second frame member unit 140 being elevated above the first frame member unit 120. A hose 147 suitable for dispensing air, water, soap, wax, foam, tire shine fluid or other suitable liquids for washing a car 400 is secured to the jointed car wash gravity hose boom 1. A handle 175 having a nozzle 176 may be secured to the hose 147 for dispensing the liquid.

In an embodiment, the first frame member unit 120 may have an upper support beam 121, a lower support beam 122 and a back brace 123. In an embodiment, the upper support beam 121, the lower support beam 122 and the back brace 123 may generally form a scalene triangle wherein the lower support beam 122 is the longest, followed by the upper support beam 121 and then the back brace 123. A pivot rod 125 (FIG. 5) may secure the first frame member unit 120 to the securing wall bracket 168 so that the first frame member unit 120 may freely rotate approximately slightly greater than one hundred and eighty degrees with respect to the stationary securing wall bracket 168. The pivot rod 125 may run substantially parallel to the back brace 123. A first and second locking pin 126 may be inserted through an opening 127 of the pivot rod 125 to temporarily lock the pivot rod 125 into place in association with the securing wall bracket 168.

In an embodiment, the first frame member unit 120 may have a first end 280 and a second end 281 and the second frame member unit 140 may have a first end 301 and a second end 302. The second end 281 of the first frame member unit 120 may be secured to the second end 302 of the second frame member unit 140 at the joint section 150. The first end 301 of the second frame member unit 140 may have a loop, hook 333 or other securing device for securing the hose 147 and allowing the hose 147 to drop down toward the center of the car wash bay 100 so that the hose 147 may be used throughout the car wash bay 100.

In an embodiment, the lower support beam 122 of the first frame member unit 120 may extend upward (with respect to the ground) at approximately a ten to forty degree angle. Although the exact angle of the upper support beam 121 of the first frame member unit 120 with respect to the ground is not critical, it is preferred (and illustrated) that the upper support beam 121 is generally parallel with respect to the ground. In an embodiment, the second frame member 140 may extend upward at the exact same angle as the lower support beam 122 of the first frame member unit 120. As a result, the present device 1 may be used for larger vehicles because the business end of the device (the first end 301 of the second frame member unit 140) remains elevated above the securing wall bracket 168. Further, because the securing wall bracket 168 may be secured lower on the wall of the car wash bay 100 and still accommodate larger vehicles, a car wash bay owner may install a second car wash cleaning boom above the present device 1.

Figure 9:
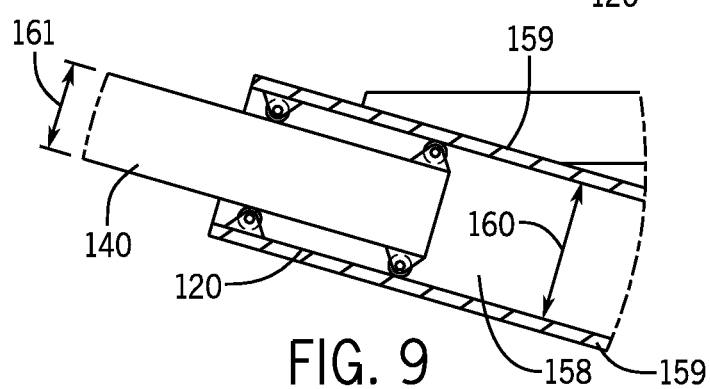
FIG. 9 illustrates a close-up view of the joint between the first frame member unit and the second frame member unit wherein the device is in the extended First Position A.
Figure 10:
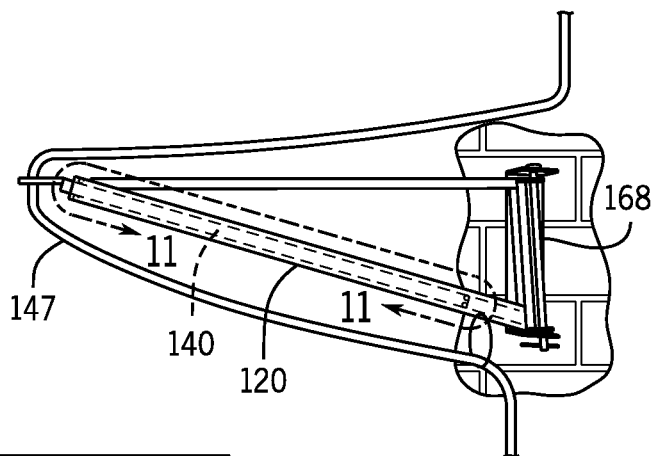
FIG. 10 illustrates a side view of the present jointed car wash gravity hose boom wherein the second frame member unit is folded backward toward the first frame member unit in the Second Position B.
Figure 11:
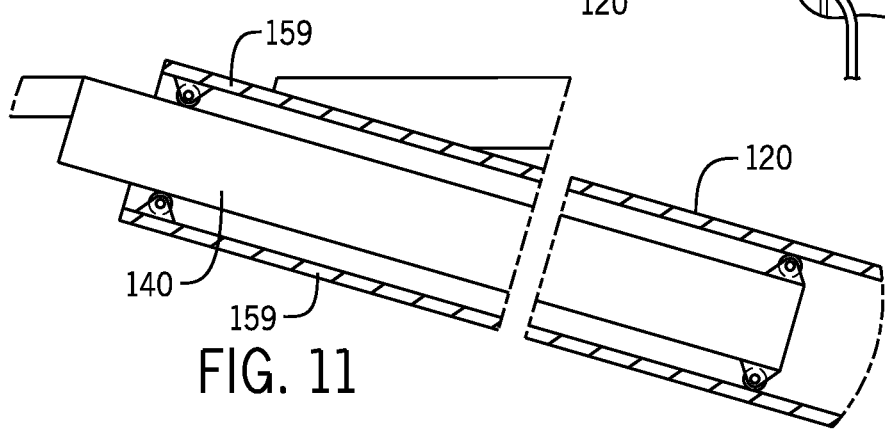
FIG. 11 illustrates a close-up side view of the present jointed car wash gravity hose boom wherein the second frame member unit is folded backward toward the first frame member unit in the Second Position B.

Referring now to FIGS. 9 and 10, in an alternative embodiment, the lower support beam 122 of the first frame member unit 120 may have a generally indented hollow interior channel portion 158 surrounded by two extended ridges 159 on opposing sides of the interior channel portion 158, similar to a standard I-Beam in construction. In this embodiment, the first frame member unit 120 may also have a width 160 and the second frame member unit 140 may have a width 161. In an embodiment, the width 160 of the first frame member unit 120 is slightly greater than the width 161 of the second frame member unit 140 such that the second frame member unit 140, when folded back into the Second Position B, partially folds into the generally indented hollow interior channel portion 158 of the lower support beam 122. More specifically, the second frame member unit 140 may be partially covered (at the top and bottom) by the two extended ridges 159 of the lower support beam 122. As a result, the two extended ridges 159 help support the weight and keep the second frame member unit 140 properly aligned when the device 1 is not being used in the First Position A.

Referring now to FIG. 5, in an embodiment, the securing wall bracket 168 may have a top flange 181, a bottom flange 182 and a main body connecting portion 400. The top flange 181 may have a single (and centered opening) while the bottom flange 182 of the securing wall bracket 168 may have a first opening 183 and a second opening 184. The first opening 183 and the second opening 184 remain off-centered from a center axis 375 running down the middle of the securing wall bracket 168. As a result of the weight of the device 1 and as a result of the off-set openings 183, 184, gravity forces the boom 1 to automatically first fold into the Second Position B when the device 1 is not being used and then gravity automatically forces the device 1 to move into the Third Position C (FIG. 12) wherein the device 1 is parallel to the wall 600. Depending on which direction the owner wishes for the jointed car wash gravity hose boom 1 to relax with respect to the wall 600, the owner may selectively place the pivot rod 125 through the first opening 183 or the second opening 184.

Figure 12:
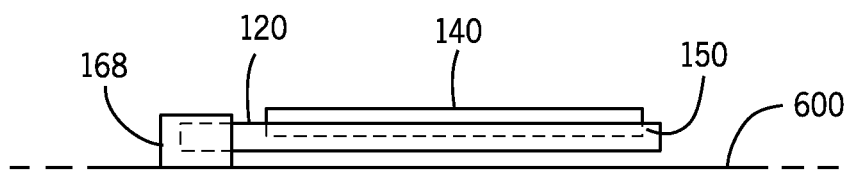
FIG. 12 illustrates a top view of the present jointed car wash gravity hose boom in the Third Position C.

The device 1 may be oriented in three positions, the First Position A (FIG. 1), the Second Position B (FIG. 10) or a Third Position C (FIG. 12) wherein the second frame member unit 140 is folded back upon the first frame member unit 120 and both the first frame member unit 120 and the second frame member unit 140, through gravity, rotate to substantially parallel to a wall of the car wash bay 100. Thus, if the device 1 is not being utilized, the device 1 will automatically move to the Third Position C (FIG. 12).

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

I claim:

1. A boom for securing a hose comprising:
    a first frame unit having a top, a bottom, a first end and a second end;
    a second frame unit having a top, a bottom, a first end and a second end;
    a jointed hinge connecting the second end of the first frame unit to the second end of the second frame unit wherein the jointed hinge allows the second frame unit to rotate with respect to the first frame unit;
    a securing device secured to the first end of the second frame unit wherein the securing device of the second frame unit is capable of securing a hose which is capable of supplying a liquid for washing a car;
    a securing brace connected to the first end of the first frame unit wherein the securing brace is secured to a wall or a pole and wherein the securing brace receives a rotating pivot pin of the first end of the first frame unit and wherein the pivot pin allows the first frame unit to rotate with respect to the securing brace and with respect to the wall or the pole; and
    wherein the securing device of the first end of the second frame unit is a generally circular rope or hook.

2. The boom for securing a hose of claim 1 wherein the first frame unit has an upper support beam, a lower support beam and a back support unit and wherein the back support unit of the first frame unit extends parallel to the pivot pin.

3. The boom for securing a hose of claim 2 wherein the lower support beam has a length which is greater than the length of the upper support beam and wherein the upper support beam extends parallel to the ground and wherein an intersection of the lower support beam and the upper support beam forms an angle.

4. The boom for securing a hose of claim 3 wherein the angle of the intersection of the upper support beam and the lower support beam is between ten and forty degrees.

5. The boom for securing a hose of claim 2 further comprising:
    a first extended ridge at a top of the lower support beam extending substantially the entire length of the lower support beam;
    a second extended ridge at the bottom of the lower support beam extending substantially the entire length of the lower support beam;
    wherein the first extended ridge and the second extended ridge of the lower support beam extend outward from a main body of the lower support beam;
    wherein the distance between the first extended ridge and the second extended ridge of the lower support beam is greater than a width of the second frame unit.

6. The boom for securing a hose of claim 5 wherein a portion of the second frame unit is secured between the first extended ridge and the second extended ridge and wherein the second extended ridge of the lower support beam supports a portion of the weight of the second frame unit while the device is in a folded orientation.

7. The boom for securing a hose of claim 1 further comprising:
    an upper extended flange extending off the securing brace and a lower extended flange extending off the securing brace wherein the upper extended flange has a single opening and wherein the lower extended flange has a first opening and a second opening wherein the first opening and the second opening are off-set from the single opening of the upper extended flange such that the opening of the upper extended flange is located equally between the first opening and the second opening of the lower extended flange of the securing brace.

8. The boom for securing a hose of claim 7 wherein the pivot pin of the first frame unit is secured either in the first opening or the second opening of the lower extended flange and wherein the off-set securing of the pivot pin automatically causes the first frame unit to rotate toward a parallel orientation with respect to the securing brace by gravity.

9. The boom for securing a hose of claim 1 wherein the second frame unit automatically rotates at the jointed hinge to an adjacent and parallel orientation with respect to the first frame unit by gravity.

10. A boom for securing a hose comprising:
a first frame unit having a top, a bottom, a first end and a second end;
a second frame unit having a top, a bottom, a first end and a second end;
a jointed hinge connecting the second end of the first frame unit to the second end of the second frame unit wherein the jointed hinge allows the second frame unit to rotate with respect to the first frame unit;
a securing device secured to the first end of the second frame unit wherein the securing device of the second frame unit is capable of securing a hose which is capable of supplying a liquid for washing a car;
a securing brace connected to the first end of the first frame unit wherein the securing brace is secured to a wall or a pole and wherein the securing brace receives a rotating pivot pin of the first end of the first frame unit and wherein the pivot pin allows the first frame unit to rotate with respect to the securing brace and with respect to the wall or the pole; and
an upper extended flange extending off the securing brace and a lower extended flange extending off the securing brace wherein the upper extended flange has a single opening and wherein the lower extended flange has a first opening and a second opening wherein the first opening and the second opening are off-set from the single opening of the upper extended flange such that the opening of the upper extended flange is located equally between the first opening and the second opening of the lower extended flange of the securing brace.

11. A boom for securing a hose comprising:
a first frame unit having a top, a bottom, a first end and a second end;
a second frame unit having a top, a bottom, a first end and a second end;
a jointed hinge connecting the second end of the first frame unit to the second end of the second frame unit wherein the jointed hinge allows the second frame unit to rotate with respect to the first frame unit;
a securing device secured to the first end of the second frame unit wherein the securing device of the second frame unit is capable of securing a hose which is capable of supplying a liquid for washing a car;
a securing brace connected to the first end of the first frame unit wherein the securing brace is secured to a wall or a pole and wherein the securing brace receives a rotating pivot pin of the first end of the first frame unit and wherein the pivot pin allows the first frame unit to rotate with respect to the securing brace and with respect to the wall or the pole;
wherein the first frame unit has an upper support beam, a lower support beam and a back support unit and wherein the back support unit of the first frame unit extends parallel to the pivot pin;
a first extended ridge at a top of the lower support beam extending substantially the entire length of the lower support beam;
a second extended ridge at the bottom of the lower support beam extending substantially the entire length of the lower support beam;
wherein the first extended ridge and the second extended ridge of the lower support beam extend outward from a main body of the lower support beam; and
wherein the distance between the first extended ridge and the second extended ridge of the lower support beam is greater than a width of the second frame unit.

12. The boom for securing a hose of claim 11 wherein a portion of the second frame unit is secured between the first extended ridge and the second extended ridge and wherein the second extended ridge of the lower support beam supports a portion of the weight of the second frame unit while the device is in a folded orientation.

13. A boom for securing a hose comprising:
a first frame unit having a top, a bottom, a first end and a second end;
a second frame unit having a top, a bottom, a first end and a second end;
a jointed hinge connecting the second end of the first frame unit to the second end of the second frame unit wherein the jointed hinge allows the second frame unit to rotate with respect to the first frame unit;
a securing device secured to the first end of the second frame unit wherein the securing device of the second frame unit is capable of securing a hose which is capable of supplying a liquid for washing a car; and
a securing brace connected to the first end of the first frame unit wherein the securing brace is secured to a wall or a pole and wherein the securing brace receives a rotating pivot pin of the first end of the first frame unit and wherein the pivot pin allows the first frame unit to rotate with respect to the securing brace and with respect to the wall or the pole;
an upper extended flange extending off the securing brace and a lower extended flange extending off the securing brace wherein the upper extended flange has a single opening and wherein the lower extended flange has a first opening and a second opening wherein the first opening and the second opening are off-set from the single opening of the upper extended flange such that the opening of the upper extended flange is located equally between the first opening and the second opening of the lower extended flange of the securing brace; and
wherein the pivot pin of the first frame unit is secured either in the first opening or the second opening of the lower extended flange and wherein the off-set securing of the pivot pin automatically causes the first frame unit to rotate toward a parallel orientation with respect to the securing brace by gravity.

14. A boom for securing a hose comprising:
a first frame unit having a top, a bottom, a first end and a second end;
a second frame unit having a top, a bottom, a first end and a second end;
a jointed hinge connecting the second end of the first frame unit to the second end of the second frame unit wherein the jointed hinge allows the second frame unit to rotate with respect to the first frame unit;
a securing device secured to the first end of the second frame unit wherein the securing device of the second frame unit is capable of securing a hose which is capable of supplying a liquid for washing a car;

a securing brace connected to the first end of the first frame unit wherein the securing brace is secured to a wall or a pole and wherein the securing brace receives a rotating pivot pin of the first end of the first frame unit and wherein the pivot pin allows the first frame unit to rotate with respect to the securing brace and with respect to the wall or the pole; and wherein the second frame unit automatically rotates at the jointed hinge to an adjacent and parallel orientation with respect to the first frame unit by gravity.

15. A boom for securing a hose comprising:

a first frame unit having a top, a bottom, a first end and a second end;

a second frame unit having a top, a bottom, a first end and a second end;

a jointed hinge connecting the second end of the first frame unit to the second end of the second frame unit wherein the jointed hinge allows the second frame unit to rotate with respect to the first frame unit;

a securing device secured to the first end of the second frame unit wherein the securing device of the second frame unit is capable of securing a hose which is capable of supplying a liquid for washing a car; and a securing brace connected to the first end of the first frame unit wherein the securing brace is secured to a wall or a pole and wherein the securing brace receives a rotating pivot pin of the first end of the first frame unit and wherein the pivot pin allows the first frame unit to rotate with respect to the securing brace and with respect to the wall or the pole;

wherein the first frame unit has an upper support beam, a lower support beam and a back support unit and wherein the back support unit of the first frame unit extends parallel to the pivot pin;

wherein the lower support beam has a length which is greater than the length of the upper support beam and wherein the upper support beam extends parallel to the ground and wherein an intersection of the lower support beam and the upper support beam forms an angle; and wherein the angle of the intersection of the upper support beam and the lower support beam is between ten and forty degrees.

* * * * *